(12) United States Patent
Sakamoto et al.

(10) Patent No.: US 7,400,644 B2
(45) Date of Patent: *Jul. 15, 2008

(54) DIGITAL SIGNAL PROCESSING APPARATUS AND METHOD, AND DIGITAL SIGNAL PROCESSING SYSTEM

(75) Inventors: Ichiro Sakamoto, Tokyo (JP); Makoto Sato, Tokyo (JP)

(73) Assignee: Sony Corporation (JP)

( * ) Notice: Subject to any disclaimer, the term of this patent is extended or adjusted under 35 U.S.C. 154(b) by 627 days.

This patent is subject to a terminal disclaimer.

(21) Appl. No.: 11/114,974

(22) Filed: Apr. 26, 2005

(65) Prior Publication Data

US 2005/0185675 A1    Aug. 25, 2005

Related U.S. Application Data

(63) Continuation of application No. 09/744,279, filed on Jan. 22, 2001, now Pat. No. 6,944,180.

(51) Int. Cl.
*H04J 3/16* (2006.01)

(52) U.S. Cl. .................. 370/465; 370/503; 370/468; 714/4

(58) Field of Classification Search ............... 370/229, 370/230, 232–239, 464, 465–469, 503; 714/716, 714/4, 806; 700/9
See application file for complete search history.

(56) References Cited

U.S. PATENT DOCUMENTS

| | | | |
|---|---|---|---|
| 5,197,062 A * | 3/1993 | Picklesimer | ............... 370/508 |
| 5,329,251 A | 7/1994 | Llewellyn | |
| 5,907,295 A | 5/1999 | Lin | |
| 5,986,589 A | 11/1999 | Rosefield et al. | |
| 6,029,239 A * | 2/2000 | Brown | ........................... 712/1 |
| 6,167,465 A * | 12/2000 | Parvin et al. | .................. 710/22 |
| 6,181,711 B1 | 1/2001 | Zhang et al. | |
| 6,298,103 B1 | 10/2001 | Huang et al. | |
| 6,609,039 B1 * | 8/2003 | Schoen | ....................... 700/94 |
| 6,665,310 B1 | 12/2003 | Nakatsugawa et al. | |
| 2001/0010040 A1 | 7/2001 | Hinderks | |

FOREIGN PATENT DOCUMENTS

| | | |
|---|---|---|
| EP | 0 825 783 A2 | 2/1998 |
| EP | 0 825 784 A2 | 2/1998 |

OTHER PUBLICATIONS

IEEE Std. 1394-1995 "IEEE Standard for a High Performance Serial Bus" Aug. 1996 IEEE Computer Society.

* cited by examiner

*Primary Examiner*—Ricky Ngo
*Assistant Examiner*—Chandrahas Patel
(74) *Attorney, Agent, or Firm*—Lerner, David, Littenberg, Krumholz & Mentlik, LLP

(57) ABSTRACT

There are provided in a rate control command a clock rate select subfunction (SYNC SELECT) to which a digital signal receiver side corresponds, a base rate set subfunction (BASE CONFIGURE), a flow rate control (FLOW CONTROL) subfunction, and a capability inquiry subfunction (CAPABILITY INQUIRY). The CAPABILITY INQUIRY subfunction is used to send to a transmitter side a clock rate select state (SYNC SELECT), base rate set state (BASE CONFIGURE), flow rate control state (FLOW CONTROL). Thereby, a digital signal can be transmitted between specific units positively and successfully.

1 Claim, 29 Drawing Sheets

| Command | | |
|---|---|---|
| | 0000 | CONTROL |
| | 0001 | STATUS |
| | 0010 | SPECIFIC INQUIRY |
| | 0011 | NOTIFY |
| | 0100 | GENERAL INQUIRY |
| | 0101 ⟨ 0111 | (reserved for future specification) |

| Response | | |
|---|---|---|
| | 1000 | NOT IMPLEMENTED |
| | 1001 | ACCEPTED |
| | 1010 | REJECTED |
| | 1011 | IN TRANSITION |
| | 1100 | IMPLEMENTED/STABLE |
| | 1101 | CHANGED |
| | 1110 | (reserved for future specification) |
| | 1111 | INTERIM |

FIG.6

| AV/C | control | taper recorder /player | ID = 0 | PLAY | FORWARD |
|---|---|---|---|---|---|
| CTS = 0000 | ctype = 0000 | subunit type = 00100 | id = 000 | opcode = C3h | operand = 75h |

FIG.8

| AV/C | accepted | taper recorder /player | ID = 0 | PLAY | FORWARD |
|---|---|---|---|---|---|
| CTS = 0000 | response = 1001 | subunit type = 00100 | id = 000 | opcode = C3h | operand = 75h |

FIG.9

|  | msb | | | | | | lsb |
|---|---|---|---|---|---|---|---|
| opcode | \multicolumn{7}{c|}{RATE (B3$_{16}$)} |
| operand [0] | \multicolumn{7}{c|}{subfunction} |
| operand [1] | \multicolumn{7}{c|}{result} |
| operand [2] | \multicolumn{7}{c|}{plug_type} |
| operand [3] | \multicolumn{7}{c|}{plug_id} |
| operand [4] ⋮ | \multicolumn{7}{c|}{subfunction_depended} |

FIG.14

| subfunction | value | meaning |
|---|---|---|
| SYNC SELECT | $00_{16}$ | Select a clock source to synchronize with a stream on a subunit source plug. |
| BASE CONFIGURE | $01_{16}$ | Configure a base rate on subunit source plug. |
| FLOW CONTROL | $02_{16}$ | Control a flow rate on a subunit source plug. |
| CAPABILITY INQUIRY | $80_{16}$ | Inquire about subunit plug capabilities associated with the RATE command. |
| — | all others | Reserved for future specification. |

FIG.15

|  | msb | lsb |
|---|---|---|
| opcode | RATE (B3$_{16}$) | |
| operand [0] | SYNC SELECT (00$_{16}$) | |
| operand [1] | result | |
| operand [2] | plug_type (00$_{16}$) | |
| operand [3] | plug_id | |
| operand [4] | sync_select_state | |
| operand [5] | destination_plug | |

FIG.16

| response frame type | result | result code name | meaning |
|---|---|---|---|
| ACCEPTED | 00₁₆ | SUCCESS | Successful completion. |
| | all others | — | Reserved for future specification. |
| REJECTED | 80₁₆ | invalid | The requested selection is invalid in the current base rate and / or flow rate |
| | 81₁₆ | unavailable | The requested selection is valid, but the controller has no permission to select the clock source on the subunit source plug because another controller is flow-controlling it. |
| | FF₁₆ | unknown | An unknown error occurred. |
| | all others | — | Reserved for future specification. |
| NOT IMPLEMENTED INTERIM | FF₁₆ | — | No result. |

FIG.17

| sync_select_state | value | meaning |
|---|---|---|
| INTERNAL | $00_{16}$ | The stream on the subunit source plug is synchronized with the internal clock. |
| EXTERNAL | $00_{16}$ | The stream on the subunit source plug is synchronized with an external clock. |
| FLOW CONTROL | $0F_{16}$ | The data rate on the subunit source plug is dynamically controlled with the FLOW CONTROL subfunction. The internal clock is expected to be controlled by on external device. |
| — | all others | Reserved for future specification. |

FIG.18

| response frame type | result | result code name | meaning |
|---|---|---|---|
| STABLE | $00_{16}$ | in_sync | The stream on the subunit source plug is in sync with the clock source. |
| | $01_{16}$ | out_of_sync | The stream on the subunit source plug is out of sync with the clock source. |
| | $08_{16}$ | stopped | The stream on the subunit source plug was stopped normally. |
| | $09_{16}$ | suspended | The stream on the subunit source plug was suspended because of some error. |
| | all others | — | Reserved for future specification. |
| NOT IMPLEMENTED REJECTED IN TRANSITION | $FF_{16}$ | — | No result. |

FIG.19

| | msb | | | | | | | lsb |
|---|---|---|---|---|---|---|---|---|
| opcode | \multicolumn{8}{c|}{RATE ($B3_{16}$)} |
| operand [0] | \multicolumn{8}{c|}{BASE CONFIGURE ($01_{16}$)} |
| operand [1] | \multicolumn{8}{c|}{result} |
| operand [2] | \multicolumn{8}{c|}{plug_type ($00_{16}$)} |
| operand [3] | \multicolumn{8}{c|}{plug_id} |
| operand [4] | \multicolumn{8}{c|}{base_config_state} |

FIG.20

| response frame type | result | result code name | meaning |
|---|---|---|---|
| ACCEPTED | $00_{16}$ | SUCCESS | Successful completion. |
| | all others | — | Reserved for future specification. |
| REJECTED | $80_{16}$ | invalid | The requested configuration is invalid in the current sync selection and/or flow rate. |
| | $81_{16}$ | unavailable | The requested configuration is valid, but the controller has no permission to configure the base rate on the subunit source plug in the FLOW CONTROL state. |
| | $82_{16}$ | not_configured | The requested configuration is valid and the subunit source plug is available, but the base rate on the subunit source plug cannot be configured to any speed other than the current base rate, because the subunit is outputting a stream on the source plug. |
| | $FF_{16}$ | unknown | An unknown error occurred. |
| | all others | — | Reserved for future specification. |
| NOT IMPLEMENTED INTERIM | $FF_{16}$ | — | No result. |

FIG.21

| base_config_state | value | value |
|---|---|---|
| X1 SPEED | $00_{16}$ | The base rate is set to x1 speed. |
| X2 SPEED | $01_{16}$ | The base rate is set to x2 speed. |
| X3 SPEED | $02_{16}$ | The base rate is set to x3 speed. |
| X4 SPEED | $03_{16}$ | The base rate is set to x4 speed. |
| X5 SPEED | $04_{16}$ | The base rate is set to x5 speed. |
| X6 SPEED | $05_{16}$ | The base rate is set to x6 speed. |
| X7 SPEED | $06_{16}$ | The base rate is set to x7 speed. |
| X8 SPEED | $07_{16}$ | The base rate is set to x8 speed. |
| X9 SPEED | $08_{16}$ | The base rate is set to x9 speed. |
| X10 SPEED | $09_{16}$ | The base rate is set to x10 speed. |
| X11 SPEED | $0A_{16}$ | The base rate is set to x11 speed. |
| X12 SPEED | $0B_{16}$ | The base rate is set to x12 speed. |
| X13 SPEED | $0C_{16}$ | The base rate is set to x13 speed. |
| X14 SPEED | $0D_{16}$ | The base rate is set to x14 speed. |
| X15 SPEED | $0E_{16}$ | The base rate is set to x15 speed. |
| X16 SPEED | $0F_{16}$ | The base rate is set to x16 speed. |
| — | $10_{16}$-$FF_{16}$ | Reserved for future specification. |

FIG.22

| response frame type | result | result code name | meaning |
|---|---|---|---|
| STABLE | $00_{16}$ | configurable | The base rate on the source plug may be configured because the subunit is NOT outputting a stream on the source plug. (This result does not guarantee the success of the configuration.) |
| | $01_{16}$ | not_configurable | The base rate on the source plug cannot be configured because the subunit is outputting a stream on the source plug. |
| | all others | — | Reserved for future specification. |
| NOT IMPLEMENTED REJECTED IN TRANSITION | $FF_{16}$ | — | No result. |

FIG.23

| | msb | | | | | | | lsb |
|---|---|---|---|---|---|---|---|---|
| opcode | RATE (B3$_{16}$) | | | | | | | |
| operand [0] | FLOW CONTROL (02$_{16}$) | | | | | | | |
| operand [1] | result | | | | | | | |
| operand [2] | plug_type (00$_{16}$) | | | | | | | |
| operand [3] | plug_id | | | | | | | |
| operand [4] | flow_control_state | | | | | | | |

FIG.24

| response frame type | result | result code name | meaning |
|---|---|---|---|
| ACCEPTED | $00_{16}$ | SUCCESS | Successful completion. |
| | all others | — | Reserved for future specification. |
| REJECTED | $80_{16}$ | invalid | The requested controller is invalid in the current sync selection and/or base rate. |
| | $81_{16}$ | unavailable | The requested control is valid, but the controller has no permission to control the flow rate on the subunit source plug in the FLOW CONTROL state. |
| | $82_{16}$ | not_controlled | The requested control is valid and the subunit source plug is available, but the flow rate on the source plug cannot be controlled with any operation other than STANDARD, because the subunit is NOT outputting a stream on the source plug. |
| | $FF_{16}$ | unknown | An unknown error occurred. |
| | all others | — | Reserved for future specification. |
| NOT IMPLEMENTED INTERIM | $FF_{16}$ | — | No result. |

FIG.25

| flow_control_state | value | meaning |
|---|---|---|
| STANDARD | $00_{16}$ | The source plug outputs a stream at the base rate. |
| FAST | $01_{16}$ | The source plug outputs a stream at the base rate +1% |
| SLOW | $81_{16}$ | The source plug outputs a stream at the base rate -1% |
| — | all others | Reserved for future specification. |

FIG.26

| response frame type | result | result code name | meaning |
|---|---|---|---|
| STABLE | $00_{16}$ | controllable | The flow rate on the source plug may be controlled because the subunit is outputting a stream on the source plug. (This result does not guarantee the success of the control.) |
| | $01_{16}$ | not_controllable | The flow rate on the source plug cannot be controlled because the subunit is NOT outputting a stream on the source plug. |
| | all others | — | Reserved for future specification. |
| NOT IMPLEMENTED REJECTED IN TRANSITION | $FF_{16}$ | — | No result. |

FIG.27

| | msb | | | | | | lsb |
|---|---|---|---|---|---|---|---|
| opcode | \multicolumn{7}{c}{RATE ($B3_{16}$)} |
| operand [0] | \multicolumn{7}{c}{CAPABILITY INQUIRY ($80_{16}$)} |
| operand [1] | \multicolumn{7}{c}{result} |
| operand [2] | \multicolumn{7}{c}{plug_type ($00_{16}$)} |
| operand [3] | \multicolumn{7}{c}{plug_id} |
| operand [4] | \multicolumn{7}{c}{number_of_combinations (n)} |
| operand [5] | | | | | | | |
| operand [6] | \multicolumn{7}{c}{combination_of_states [0]} |
| operand [7] | | | | | | | |
| ⋮ | \multicolumn{7}{c}{⋮} |
| ⋮ | | | | | | | |
| ⋮ | \multicolumn{7}{c}{combination_of_states [n-1]} |
| ⋮ | | | | | | | |

FIG.28

| address offset | combination_of_states [ ] |
|---|---|
| $00_{16}$ | sync_select_state |
| $01_{16}$ | base_config_state |
| $02_{16}$ | flow_control_state |

FIG.29

| response frame type | result | meaning |
|---|---|---|
| ACCEPTED | xxxx xxx1₂ | combination_of_states [0] is supported. |
| | xxxx xx1x₂ | combination_of_states [1] is supported. |
| | xxxx x1xx₂ | combination_of_states [2] is supported. |
| | xxxx 1xxx₂ | combination_of_states [3] is supported. |
| | xxx1 xxxx₂ | combination_of_states [4] is supported. |
| | xx1x xxxx₂ | combination_of_states [5] is supported. |
| | x1xx xxxx₂ | combination_of_states [6] is supported. |
| | 1xxx xxxx₂ | combination_of_states [7] is supported. |
| REJECTED NOT IMPLEMENTED INTERIM | FF₁₆ | No result. |

FIG.30

DIGITAL SIGNAL PROCESSING APPARATUS AND METHOD, AND DIGITAL SIGNAL PROCESSING SYSTEM

CROSS REFERENCE TO RELATED APPLICATIONS

This application is a continuation of U.S. application Ser. No. 09/744,279, filed on Jan. 22, 2001, now issued as U.S. Pat. No. 6,944,180 on Sep. 13, 2005, the entire disclosure of which is hereby incorporated by reference herein.

TECHNICAL FIELD

The present invention relates to a digital signal processing apparatus and method, and a digital signal processing system, suitably applicable to transmission of digital audio data, digital video data, etc. using the IEEE (The Institute of Electrical and Electronics Engineers, Inc.) 1394.

BACKGROUND ART

In some conventional audio and vide units for example, audio or video signal is transmitted by digital signal to effectively avoid deterioration of sound or image quality.

An audio unit will be described by way of example. When an audio signal played back by a compact disc player for example is recorded by a mini disc player, the compact disc player modulates a played-back digital audio signal based on a clock of the digital audio signal before outputting the audio signal to the mini disc player. On the other hand, the mini disc player to receive the digital audio signal from the compact disc player uses a PLL circuit to extract the clock from the digital signal transmitted from the compact disc player, and then plays back the received digital audio signal based on the extracted clock. Thereby, the mini disc player processes, or records for example, the received digital audio signal synchronously with the clock of the digital audio signal transmitted from the compact disc player.

That is, for transmission of a digital audio signal or digital video signal, the receiving side will operate synchronously with the clock of the received digital audio or video signal.

Signal transmission with a plurality of units connected to the bus line defined by the IEEE 1394 for example will be discussed herebelow. In this case, a digital audio or video signal played back from a disc or the like in one playback unit or player is sent to the bus line and received and recorded by a recording unit or recorder also connected to the bus line.

To record the digital audio or video signal, it is necessary that the player should be completely synchronous with the recorder. Desirably, no jitter should be contained in the transmitted digital signal. However, it is difficult to completely eliminate the jitter.

For synchronization between the playback operation of the player and recording operation of the recorder, it is possible that control data on the playback operation, etc. is transmitted via a bus line for synchronization between the two units, namely, between the player and recorder. However, since more than two units can be connected to the bus line defined in the IEEE 1394 for example and data can be transmitted at a plurality of rates over the bus line, so if in the middle of a digital signal output of a player being recorded in a recorder, the player has received a different rate control command from any other unit, the recorder will not be able to record the digital signal normally, namely, fail in recording the digital signal.

DISCLOSURE OF THE INVENTION

Accordingly, the present invention has an object to overcome the above-mentioned drawbacks of the prior art by providing a digital signal processing apparatus and method, and a digital signal processing system, adapted to transmit a digital signal between specified units positively and successfully.

The above object can be attained by providing a digital signal processor connected via a predetermined transmission line to a unit whose data transmission rate can be controlled at least from outside, the processor including according to the present invention: means for generating a command for making an inquiry to the unit connected via the predetermined transmission line as to its rate controllability; means for transmitting the command to the predetermined transmission line; and means for receiving a response to the transmitted command.

In the above digital signal processor, the rate control includes a synchronous control, base data transmission rate control, and a variable rate control for fine adjustment of the base data transmission rate. Also, the above digital signal processor further includes means for recognizing, based on the received response, the rate controllability of the unit. Further, the above digital signal processor additionally includes means for controlling the data transmission rate correspondingly to the rate controllability of the unit, having been recognized based on the received response.

Also the above object can be attained by providing a digital signal processor connected via a predetermined transmission line to a unit whose data transmission rate can be controlled at least from outside, the processor including according to the present invention: means for receiving a command for inquiry of the rate controllability transmitted from the predetermined transmission line; means for examining, based on the command, its own rate controllability; and means for sending back the result of the examination.

In the above digital signal processor, the rate control includes a synchronous control, base data transmission rate control, and a variable rate control for fine adjustment of the base data transmission rate.

Also the above object can be attained by providing a digital signal processing system including according to the present invention: a first digital signal processor connected via a predetermined transmission line to a unit whose data transmission rate can be controlled at least from outside, the first digital signal processor including: means for generating a command for making an inquiry to the unit connected via the predetermined transmission line as to its rate controllability; means for transmitting the command to the predetermined transmission line; and means for receiving a response to the transmitted command; and a second digital signal processor connected via the predetermined transmission line to a unit whose data transmission rate can be controlled at least from outside, the second digital signal processor including: means for receiving a command for inquiry of the rate controllability transmitted from the predetermined transmission line; means for examining, based on the command, its own rate controllability; and means for sending back the result of the examination.

In the above digital signal processing system, the rate control includes a synchronous control, base data transmission rate control, and a variable rate control for fine adjustment of the base data transmission rate. Also, the above first digital signal processor further includes means for recognizing, based on the received response, the rate controllability of the unit. Further, the above first digital signal processor additionally includes means for controlling the data transmission rate correspondingly to the rate controllability of the unit, having been recognized based on the received response.

Also, the above object can be attained by providing a digital signal processing method for a unit connected via a predetermined transmission line to a unit whose data transmission rate can be controlled at least from outside, the method including, according to the present invention, steps of: generating a command for making an inquiry to the unit connected via the predetermined transmission line as to its rate controllability; transmitting the command to the predetermined transmission line; and receiving a response to the transmitted command.

In the above digital signal processing method, the rate control includes a synchronous control, base data transmission rate control, and a variable rate control for fine adjustment of the base data transmission rate. Also, the above digital signal processing method further includes a step of recognizing, based on the received response, the rate controllability of the unit. Further, the above digital signal processing method additionally includes a step of controlling the data transmission rate correspondingly to the rate controllability of the unit, having been recognized based on the received response.

Also the above object can be attained by providing a digital signal processing method for a unit connected via a predetermined transmission line to a unit whose data transmission rate can be controlled at least from outside, the method including, according to the present invention, steps of: receiving a command for inquiry of the rate controllability transmitted from the predetermined transmission line; examining, based on the command, its own rate controllability; and sending back the result of the examination.

In the above digital signal processing method, the rate control includes a synchronous control, base data transmission rate control, and a variable rate control for fine adjustment of the base data transmission rate.

Also the above object can be attained by providing a digital signal processing method for a unit connected via a predetermined transmission line to a unit whose data transmission rate can be controlled at least from outside, the method including according to the present invention: a first digital signal processing procedure including steps of: generating a command for making an inquiry to the unit connected via the predetermined transmission line as to its rate controllability; transmitting the command to the predetermined transmission line; and receiving a response to the transmitted command; and a second digital signal processing procedure including steps of: receiving a command for inquiry of the rate controllability transmitted from the predetermined transmission line; examining, based on the command, its own rate controllability; and sending back the result of the examination.

In the above digital signal processing method the rate control includes a synchronous control, base data transmission rate control, and a variable rate control for fine adjustment of the base data transmission rate. Also, the above first digital signal processing procedure further includes a step of recognizing, based on the received response, the rate controllability of the unit. Further, the above first digital signal processing procedure additionally includes a step of controlling the data transmission rate correspondingly to the rate controllability of the unit, having been recognized based on the received response.

BRIEF DESCRIPTION OF THE DRAWINGS

FIG. 6 shows a specific example of ctype/response of the asynchronous packet.

FIG. 8 explains a specific example of the AV/C command.

FIG. 9 explains a specific example of th response to the AV/C command.

FIG. 14 explains the rate control command.

FIG. 15 explains the subfunction field in FIG. 14.

FIG. 16 explains the SYNC SELECT subfunction in FIG. 15.

FIG. 17 explains the result field in FIG. 16.

FIG. 18 explains the sync_select field in FIG. 16.

FIG. 19 explains the result field in FIG. 16, which will be when the selected state is stable.

FIG. 20 explains the BASE CONFIGURE subfunction in FIG. 15.

FIG. 21 explains the result field in FIG. 20.

FIG. 22 explains the base_config_state field in FIG. 16.

FIG. 23 explains the result field in FIG. 20, which will be when the selected state is stable.

FIG. 24 explains the FLOW CONTROL subfunction in FIG. 15.

FIG. 25 explains the result field in FIG. 24.

FIG. 26 explains the flow_control_state field in FIG. 24.

FIG. 27 explains the result field in FIG. 24, which will be when the selected state is stable.

FIG. 28 explains the CAPABILITY INQUIRY subfunction in FIG. 15.

FIG. 29 explains the combination_of_state [ ] field in FIG. 28,

FIG. 30 explains the result field in FIG. 28, which will be when the selected state is stable.

BEST MODE FOR CARRYING OUT THE INVENTION

The preferred embodiments of the present invention will be described herebelow with reference to the accompanying drawings.

Figure 1:
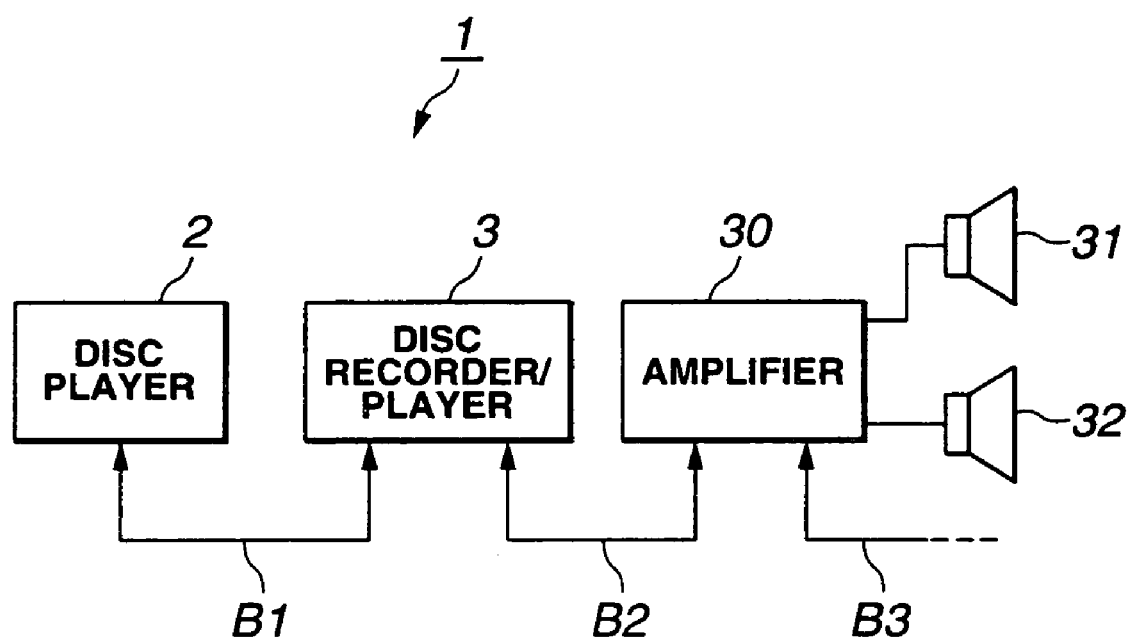
FIG. 1 is a general block diagram of an audio system according to the present invention.

Referring now to FIG. 1, there is illustrated in the form of a schematic block diagram the audio system using a disc as a recording medium according to the present invention. Of course, the present invention is applicable to a video system or other system as well as to the audio system. Although the audio system using a disc medium is shown by way of example in FIG. 1, the system may be a one using a tape medium or semiconductor memory medium. The audio system according to the present invention is generally indicated with a reference 1.

As shown in FIG. 1, the audio system 1 comprises a disc player 3, disc recorder/player 3 and amplifier 30, and speakers 31 and 32. In the audio system 1, a digital audio signal is read from a read-only optical disc, for example, played in the disc player 2, and transmitted to the disc recorder/player 3 in which the transmitted digital audio signal is written to another recordable optical disc (e.g., magneto-optical disc). Also, the disc recorder/player 3 transmits the digital audio signal read by the disc player 2 to the amplifier 30 to which the right and left speakers 31 and 32 are connected. The digital audio signal amplified by the amplifier 30 is released as a sound. In this case, the disc player 2, disc recorder/player 3 and amplifier 30 are connected to each other by bus lines B1 and B2 as defined in the IEEE (The Institute of Electrical and Electronics Engineers) 1394 interface standard. Note that in the IEEE 1394-defined interface system, units may be connected in any order. FIG. 1 shows just an example of the connection. Also, the above components can be connected to other audio units (not shown) by another bus line B3.

The definition of the interface system in the IEEE 1394 standard will be described below:

In the IEEE 1394 interface standard, an AV/C command transaction set (will be referred to as "AV/C command set" hereinafter) is defined as a command for controlling AV (audio and visual) units connected to each other via the IEEE 1394 bus. The detail of the AV/C command set is referred to the document "AV/C Command Set for Rate Control of Isochronous Data Flow 1.0 TA Candidate 1.0, Dec. 16, 1999".

The AV/C command set uses a concept of a unit representing the unit itself and a concept of a subunit representing a function of the unit. In the AV/C command set, there is provided a register area called "descriptor" to present a variety of information on a unit to external units, and the function of each unit is described in a "subunit identifier descriptor". Of these AV units, a one accessing any other unit is called "controller" while a one controlled by the controller (unit accessed from other units) is called "target". When a system is established, the controller can know the function of the target by reading the subunit identifier descriptor.

Figure 2:
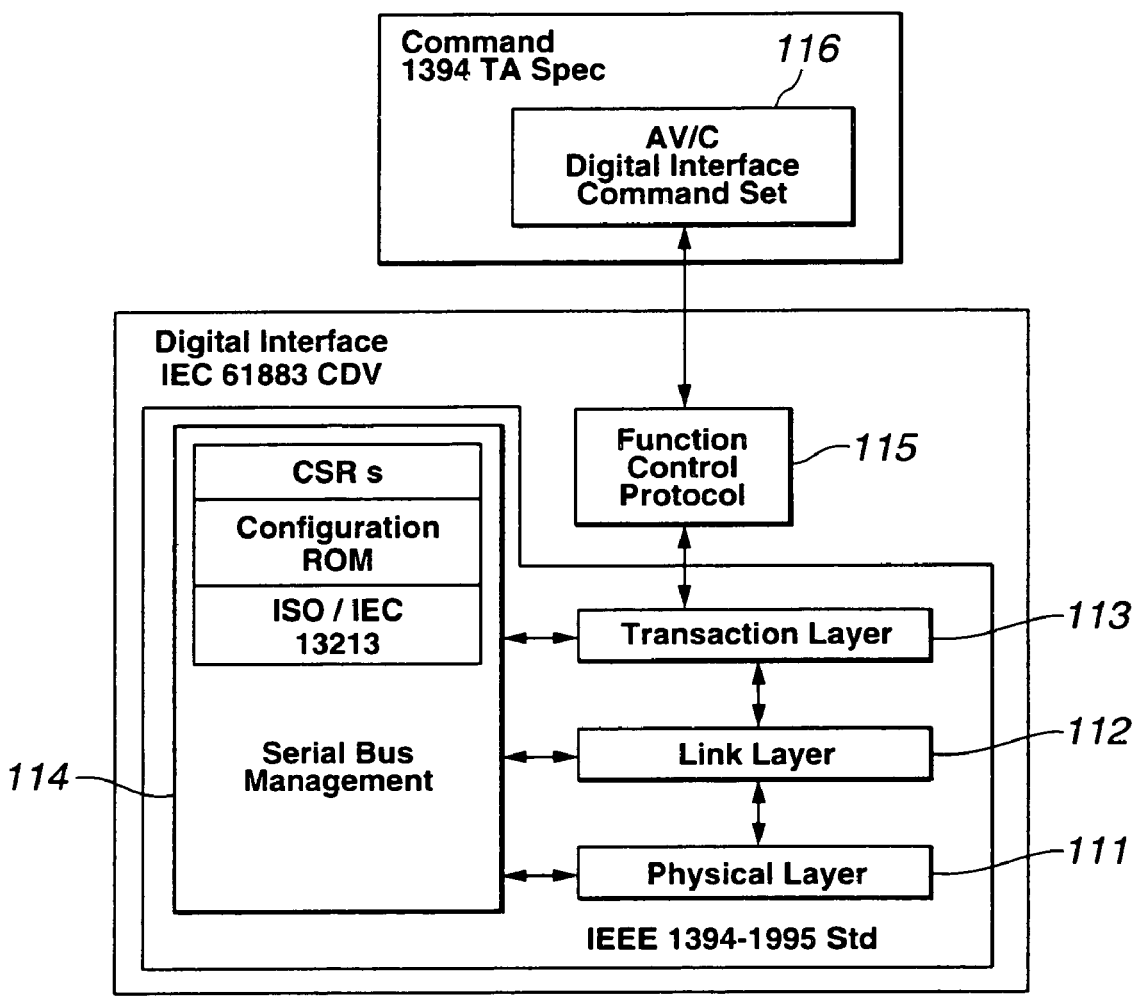
FIG. 2 explains a stack model of AV/C command set.

The AV/C command set will be described below:

Referring now to FIG. 2, there is illustrated a stack model of the AV/C command set. As shown, the stack model includes a physical layer 111, link layer 112, transaction layer 113 and serial bus management 114, all conforming to IEEE 1394. Also the stack model includes an FCP (function control protocol) 115 conforming to IEC 61883, and an AV/C command set 116 conforming to 1394 TA Specification.

Figure 3:
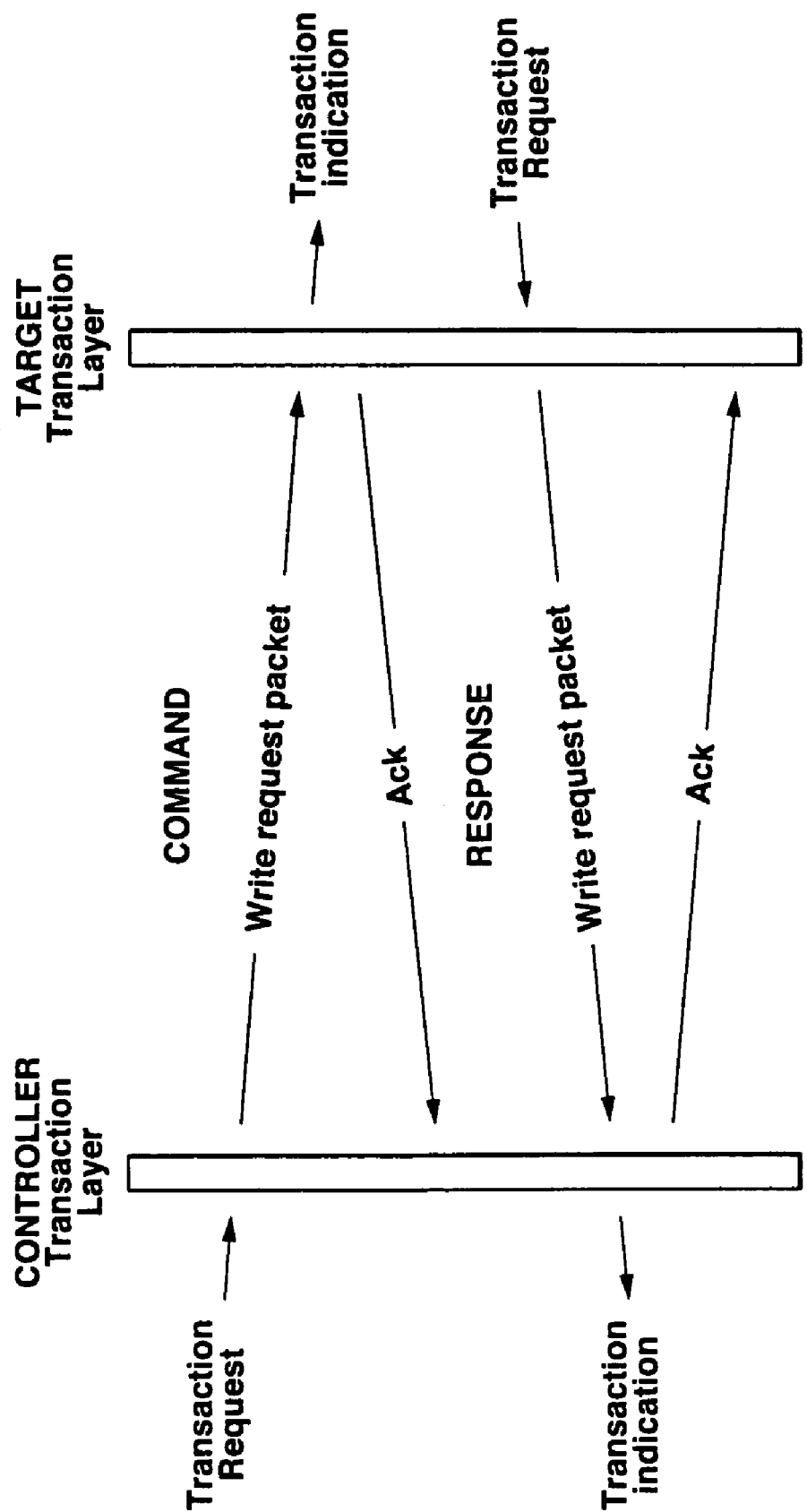
FIG. 3 explains FCP command and response.

FIG. 3 explains a relation between a command to, and a response of, the FCP 115 in FIG. 2.

The FCP 115 is a protocol to control an AV unit conforming to IEEE 1394. As shown in FIG. 3, the controlling side is a controller while the controlled side is a target. Sending of a command to the FCP 115, and response from the FCP, are made between nodes using a transaction of IEEE 1394 asynchronous communications. Having received data, the target sends back an acknowledge (ACK) for the data reception.

Figure 4:
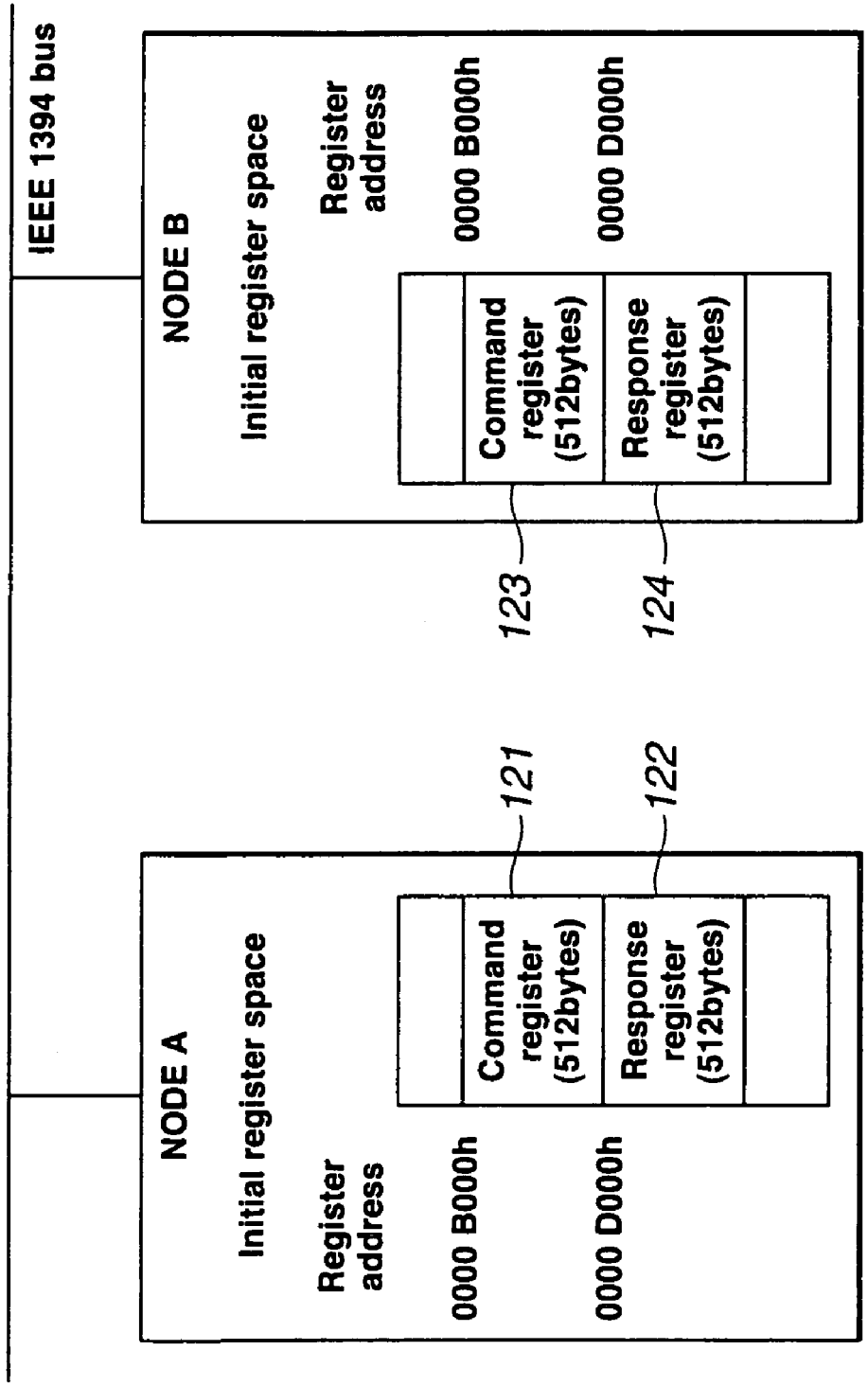
FIG. 4 explains a relation between FCP command and response in further detail.

FIG. 4 further explains the relation between the command to, and response from the FCP shown in FIG. 3.

Nodes A and B are connected to each other via the IEEE 1394 bus. In an example shown in FIG. 4, the node A is the controller and the node B is the target. Each of the nodes A and B has provided therein a command register and response register each of 512 bytes. As shown in FIG. 4, the controller transmits an instruction by writing a command message to a command register 123 of the target.

Conversely, the target transmits a response by writing a response message to a response register 122 of the controller. These controller and target transfer the two messages in pair between them.

Figure 5:
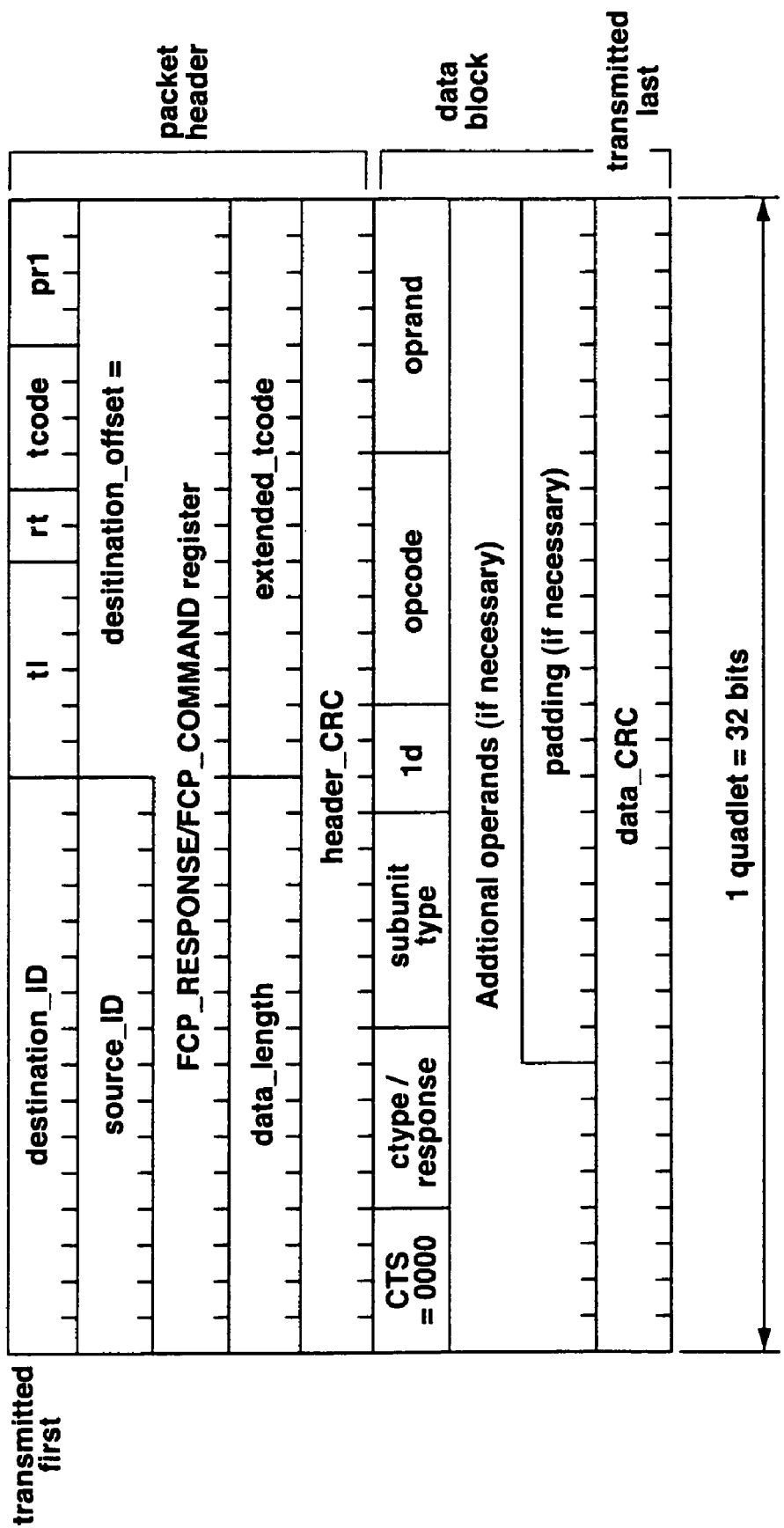
FIG. 5 shows the data structure of asynchronous packet of AV/C command.

The type of a command set sent by the FCP is described in CTS in a data field shown in FIG. 5.

FIG. 5 shows the data structure of an asynchronous packet of the AV/C command. The asynchronous transfer packet is an asynchronous one-to-one communication packet in which a data source and data destination are defined.

The AV/C command set is a command set to control an AV unit, and the CTS (command set ID) is "0000" (CTS="0000"). Also, the FCP is used to transfer an AV/C command frame and response frame between the nodes. Further, a response to a command should be made within 100 ms for no burden to the bus and AV unit.

As shown in FIG. 5, the data in the asynchronous packet is of 32 bits (=one quadlet) in the horizontal direction. The middle portion of FIG. 22 shows a header portion of the packet, an the lower portion shows a data block. In FIG. 5, destination_ID indicates a destination.

The CTS indicates a command set ID. In the AV/C command set, the CTS="0000". In FIG. 22, the ctype/response field indicates a functional classification when the packet is a command, and a result of command processing when the packet is a response.

The commands generally include four types:
(1) a command to control the function from outside (CONTROL command),
(2) a command to inquire the status from outside (STATUS command),
(3) a GENERAL INQUIRY command to inquire from outside whether there is available a support for the CONTROL command (for inquiry of whether a support is available for opcode) and SPECIFIC INQUIRY command (for inquiry of whether supports are available for opcode and operands), and
(4) a command to request to notify a change of the status to outside (NOTIFY command).

The response is sent back depending upon the type of the command. The responses corresponding to the CONTROL command include NOT IMPLEMENTED, ACCEPTED, REJECTED and INTERIM. The responses corresponding to the STATUS command include NOT IMPLEMENTED, REJECTED, IN TRANSITION and STABLE. The responses corresponding to the GENERAL INQUIRY and SPECIFIC INQUIRY commands include IMPLEMENTED and NOT IMPLEMENTED. The responses corresponding to the NOTIFY command include NOT IMPLEMENTED, REJECTED, INTERIM and CHANGED.

Subunit type in FIG. 5 is provided to identify the function in the unit. For example, tape recorder/player, tuner, etc. are assigned to this field. To identify a plurality of subunits of the same type, if any, addressing is made using subunit id as an ID number. Opcode indicates a command, and operand indicates a parameter of the command. Additional operands is a field added as necessary. Padding is also a field added as necessary. Data CRC (cyclic redundancy check) is used for error check during data transmission.

Figure 7:
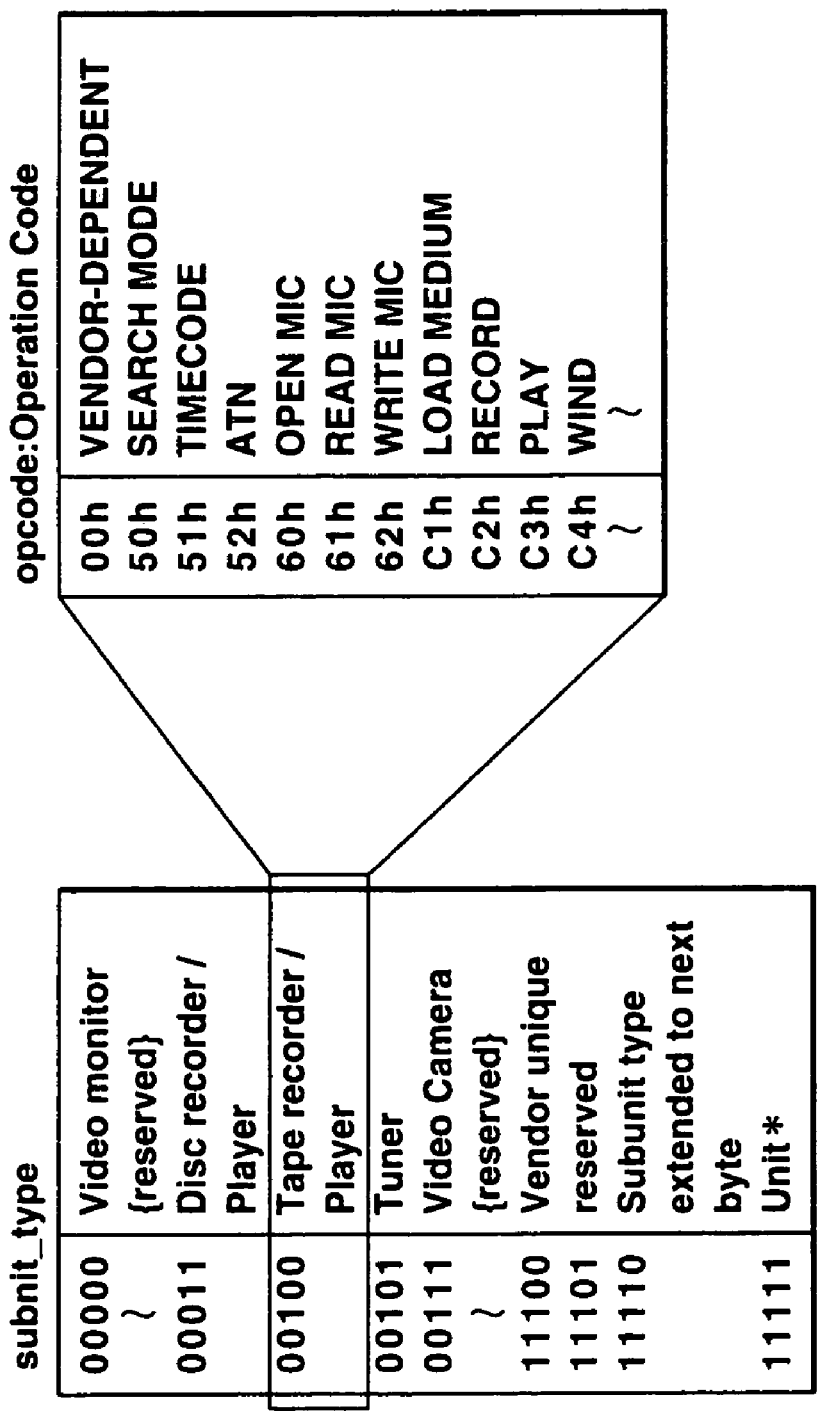
FIG. 7 shows a specific example of subunit type and opcode.

FIGS. 6 and 7 shows specific examples of the AV/C commands.

FIG. 6 shows a specific example of ctype/response of the asynchronous packet in FIG. 5. The upper portion of FIG. 6 shows commands, and lower portion show responses. "0000"

is assigned CONTROL, "0001" is assigned STATUS, "0010" is assigned SPECIFIC INQUIRY, "0011" is assigned NOTIFY, and "0100" is assigned GENERAL INQUIRY. "0101" to "0111" are reversed for future specification. Also, "1000" is assigned NOT IMPLEMENTED, "1001" is assigned ACCEPTED, "1010" is assigned REJECTED, "1011" is assigned in TRANSITION, "1100" is assigned IMPLEMENTED/STABLE, "1101" is assigned CHANGED, and "1111" is assigned INTERIM. "1110" is reserved for future specification.

FIG. 7 shows a specific example of submit type and opcode. "00000" of subunit_type in FIG. 7 is assigned Video monitor, "00011" is assigned Disk recorder/Player, "00100a" is assigned Tape Recorder/Player, "00101" is assigned Tuner, "00111" is assigned Video camera, "11100" is assigned Vendor unique, and "11110" is assigned Subunit type extended to next byte. Note that although "11111" is assigned unit, this is sent to a unit itself and it includes power on/off for example.

As shown in FIG. 7, an opcode table exists for each subunit. In FIG. 7, an opcode when the subunit type is Tape recorder/Player is shown by way of example. Also, an operand is defined for each opcode. As shown, "00h" is assigned VENDOR-DEPENDENT, "50h" is assigned SEARCH MODE, "51h" is assigned TIMECODE, "52h" is assigned ATN, "60h" is assigned OPEN MIC, "61h" is assigned READ MIC, "62h" is assigned WRITE MIC, "C1h" is assigned LOAD MEDIUM, "62h" is assigned RECORD, "C3h" is assigned PLAY, and "C4h" is assigned WIND.

FIGS. 8 and 9 show a specific example of AV/C command set and response thereto. Note that in FIGS. 8 and 9, there are shown an AV/C command set and response thereto which will be when the subunit type is Tape recorder/Player.

For example, to have an AV unit as a target playback information, an AV unit as a controller will send a command as shown in FIG. 8 to the target.

Since the AV unit as a controller uses the AV/C command set, the CTS in FIG. 22 is set "0000", and since the command to control the unit from outside (CONTROL command) is used, ctype/response is set ctype="0000" (see FIG. 6). Subunit type is the type of the subunit (subunit type="00100" when the subunit type is Tape recorder/Player) (see FIG. 7). id shows ID0 and it is 000. opcode is "C3h" meaning playback (see FIG. 7). operand is "75h" meaning FORWARD.

In response to the command shown in FIG. 8, the target will send back a response shown in FIG. 9 to the controller. Since "accepted" is included in the "response" as shown in FIG. 9, the response="1001" (see FIG. 6). Since the command in FIG. 9 is the same as that in FIG. 8 except for the "response", it will not be described any further.

Figure 10:
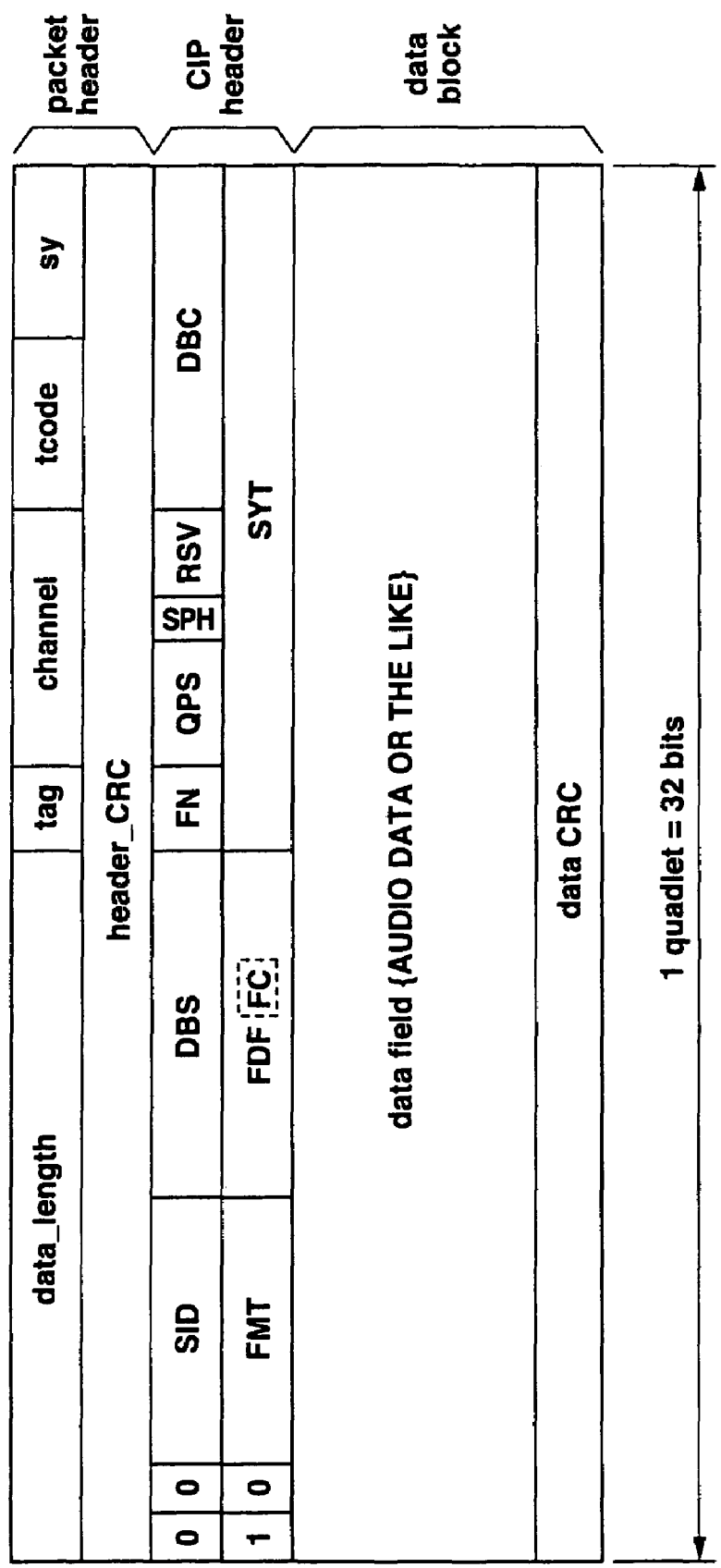
FIG. 10 explains the data structure of the asynchronous packet.

On the other hand, various data which should be real-time and synchronous such as audio data are transmitted as an isochronous packet having a data structure as shown in FIG. 10.

FIG. 10 shows a part of the isochronous packet. The data in the isochronous packet is composed of 32 bits in the horizontal direction (=1 quadlet). The upper portion of FIG. 10 shows a header, and the lower portion shows a data block. Note that an isochronous packet is sequentially transferred from the upper left to the lower right of the packet shown in FIG. 10.

The isochronous packet is assigned a packet header composed of a data length, tag, channel, packet code (tcode), synchronization code (sy) and an error correction code (CRC).

The isochronous packet is also assigned a CIP (common isochronous packet) header composed of a self-identification code (SID), data block size (DBS), number of packet divisions (FN), marker indicating whether there exists a source packet header (SPH), reserve (RSV), and a count of a succession of packets which would be when data of a specific size is divided and divided data is assigned to each packet (DBC) included in a former area of 32 bits, and a transmission format (FMT), area to which format-dependent data is assigned (FDF) and a recording area such as a time stamp (SYT) in a latter area of 32 bits.

The rest of the isochronous packet is a data block composed of a data field in which audio data, etc. being source data in 32 bits are included, and which is followed by a data correction code (CRC) for the data.

In this embodiment, one bit (as shown enclosed with a dash line in FIG. 10) in a specific position in the FDF area to which format-dependent data of 8 bits is assigned is assigned to a flag indicating whether the transmission rate of audio signal is being controlled as will be described later (FC). When the flag FC is a signal "1", it means that the transmission rate is being controlled. When the flag FC is a signal "0", it means that the transmission rate is not being controlled. The control of the transmission rate will further be described later.

Figure 11:
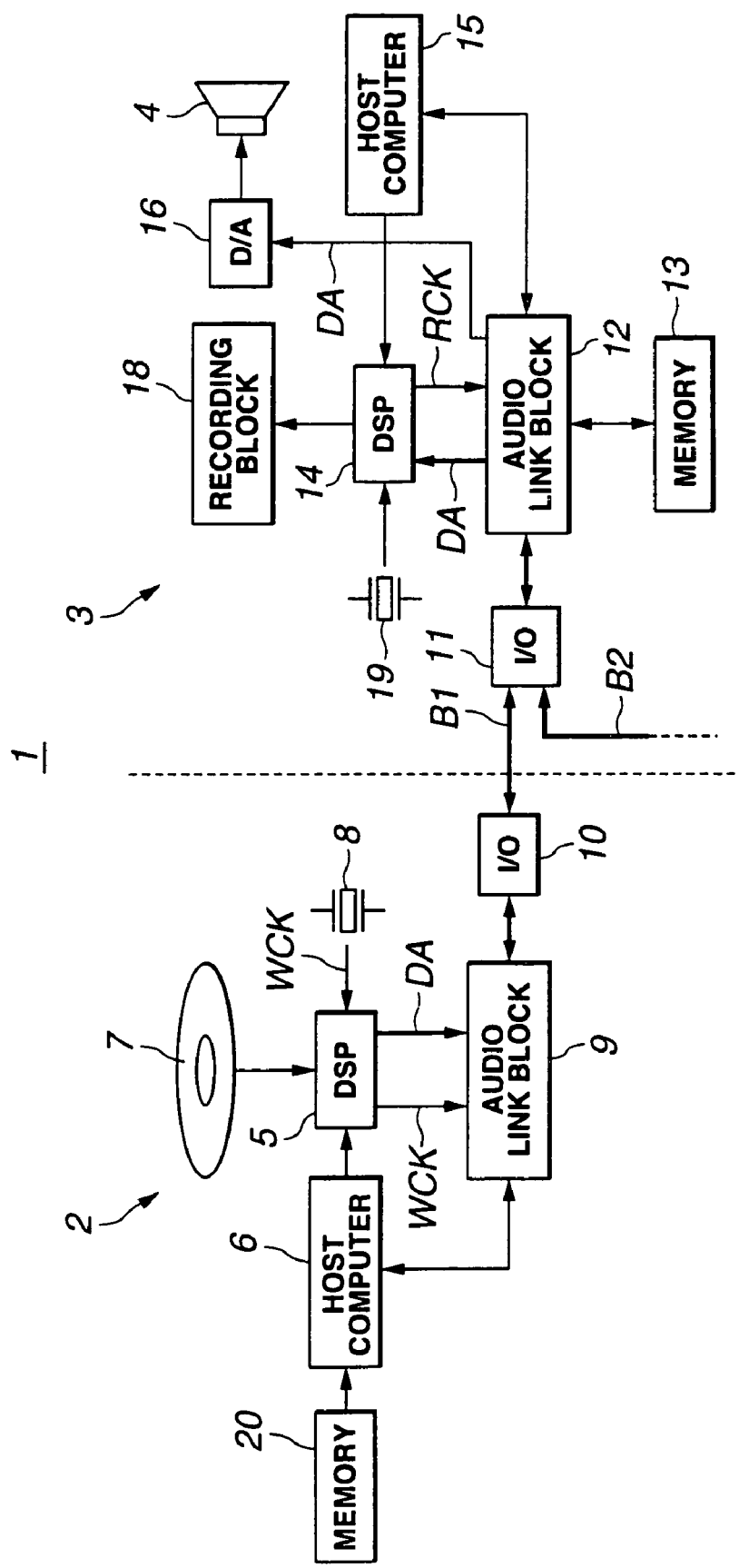
FIG. 11 is a detailed block diagram of the audio system according to the present invention.

Referring now to FIG. 11, there is illustrated in the form of a detailed block diagram the embodiment of audio system 1 shown in FIG. 1. The audio system 1 is composed of the disc player 2 and a disc recorder/player 3.

In the disc player 2, a digital signal processor (DSP) 5 is controlled by a host computer 6 to rotate an optical disc 7 and read out digital audio signal DA from the optical disc. The digital signal processor 5 works synchronously with a clock WCK generated by a crystal oscillator 8 incorporated in the disc player 2 to read the digital audio signal DA, and provides the read digital audio signal DA to an audio link block 9. That is, the digital signal processor 5 reads the optical disc at a read speed designated by the host computer 6 and provides the read digital audio signal DA. Note that in this embodiment, double, quadruple, octuple or sixteen-fold read speed scan be set in addition to the normal read speed. Also, each of the read time once set can be fine-adjusted by plus/minus few percent (e.g., ±1% or so).

The audio link block 9 packets the digital audio signal DA under the control of the host computer 6, and controls an input/output circuit 10 to provide the packetized digital audio signal DA to the disc recorder/player 3. Also, the audio link block 9 acquires a packet supplied via the input/output circuit 10 and sends the content of the packet to the host computer 6 as necessary.

The input/output circuit 10 subjects to the output data from the audio link block 9 to a parallel-serial conversion, adds to a predetermined data to the converted data, subjects the data to biphase mark modulation, and then provides the result to the bus line B1. More specifically, the input/output circuit 10 superposes a clock WCK necessary to read a packet on the packet supplied from the audio link block 9, and provides the result to the bus line B1. Also, the input/output circuit 10 monitors packets transmitted on the bus line B1, and acquires a packet destined to the disc player 2. The input/output circuit 10 decodes the acquired packet, subjects it to a serial/parallel conversion, and provides the conversion result to the audio link block 9.

Connected between the disc player 2 and disc recorder/player 3 by means of the bus line B1 defined in the IEEE 1394 interface standard, the audio link block and input/output circuit 10 packet a digital audio signal DA using the format defined in the IEEE 1394 standard, and notifies the host computer 6 of the data transmitted by the packet. More specifically, the digital audio signal DA is real-time transmitted as an isochronous packet defined in the IEEE 1394 interface standard and shown in FIG. 10, and other data such as various control commands are transmitted as asynchronous packets as shown in FIG. 5 asynchronously and at any time.

The audio link block 9 appends a predetermined unit of the digital audio signal DA to the isochronous packet having the structure as shown in FIG. 10, and provides the packet to the input/output circuit 10.

Receiving the one-to-one communication asynchronous packet received by the input/output circuit 10 and shown in FIG. 5, the audio link block 9 transfers data assigned to the packet to the host computer 6, whereby the host computer 6 is notified of various control commands sent from the disc recorder/player 3 to the disc player 2.

The host computer 6 is composed of a computer which controls the operation of the whole disc player 2 and responds to the operation of each of controls disposed on the control panel of the disc player 2 to control the operation of the digital signal processor 5, thereby reading the optical disc 7.

When the digital audio signal DA read from the optical disc 7 is transmitted to the disc recorder/player 3, the host computer 7 receives a control command sent from the disc recorder/player 3 via the audio link block 9, and control the reading operation of the optical disc 7 according to the control command.

Namely, when supplied with a control command for fine adjustment of the reading rate for example from the disc recorder/player 3, the host computer 6 instructs the digital signal processor 5 to ste the reading state of the optical disc 7 to a one specified by the command. Also, when supplied with a control command for changing the reading speed from the disc recorder/player 3, the host computer 6 will instruct the digital signal processor 5 to change the reading speed to a one specified by the control command.

Thus, the disc player 2 changes the data transmission rate per unit time under the control of the disc recorder/player 3, and sends the digital audio signal DA at the data transmission rate.

The disc player 2 includes also a memory 20 having described therein the function of each subunit as at least a subunit identifier descriptor. Further the descriptor has stored therein information corresponding to a rate control in the disc player 2. The rate control will further be described later. The host computer 6 responds to a command for capability inquiry, which will further be described later, sent from the disc recorder/player 3, to read information corresponding to the rate control, stored in the memory 20.

On the other hand, the disc recorder/player 3 includes also an input/output circuit 11. Similarly to the input/output circuit 10 in the disc player 2, the input/output circuit 11 in the disc recorder/player 3 monitors packets transmitted on the bus lines B1 and B2 and acquires a packet designating the disc recorder/player 3. Further, the input/output circuit 11 transfers the data in the acquired data to an audio link block 12 also included in the disc recorder/player 3. At this time, the input/output circuit 11 will detect data transmitted from the bus lines B1 and B2 synchronously with a predetermined clock, and play back each data in the transmitted packet.

When an isochronous packet by which audio data is carried is received in a transmission mode not being a flow rate-controlled mode which will further be described later, the input/output circuit 11 will reference to a time stamp disposed in the recording area SYT, and play back the data in the packet synchronously with the transmitted audio data. On the other hand, when the isochronous packet is received in the flow rate-controlled mode, the input/output circuit 11 plays back the data in the packet without reference to the time stamp disposed in the recording area SYT. Namely, the input/output circuit 11 will play back the data in the transmitted packet synchronously with a clock generated by a crystal oscillator 19 being a clock generator also provided in the disc recorder/player 3. However, when the synchronous playback is possible with reference to the time stamp even in the flow rate-controlled mode, the input/output circuit 11 may play back the data in the packet using the time stamp.

The audio link block 12 acquires a packet from the input/output circuit 11, and stores the digital audio signal DA assigned to the packet into a recording read for digital audio signal DA set in a memory 13 also provided in the disc recording/player 3 as shown in FIG. 11. Also, the audio link block 12 provides digital audio signal DA held in the memory 13 to a digital signal processor 14 or digital/analog converter (D/A) 16 also provided in the disc recorder/player 3 under the control of a host computer 15 also provided in the disc recorder/player 3, and ceases to read out digital audio signal DA from the memory 13.

In this series of operations, the audio link block 12 records digital audio signal DA into the memory 13 with reference to a clock WCK superposed on the input data, synchronous with the clock WCK of the disc player 2, and then reads, and provides as output, the digital audio signal from the memory 13 with reference to a clock RCK provided from the digital signal processor 14.

A recording block 18 also provided in the disc recorder/player 3 is composed of a drive mechanism to drive the disc, recording/playback system such as an optical pickup, etc. sequentially forms marks in a magneto-optical disc correspondingly to a recording signal provided from the digital signal processor 14.

The digital signal processor 14 controls the operation of the recording block 18 and generates a recording signal corresponding to the digital audio signal DA provided from the audio link block 12. Thus, the disc recorder/player 3 records the digital audio signal DA to the optical disc by means of the digital signal processor 14 and recording block 18.

At this time, the digital signal processor 14 generates, by means of a crystal oscillator 19 incorporated therein, a clock RCK asynchronous with the clock WCK of the discs player 2 and whose precision is high, and processes digital audio signal DA from the audio link block 12 with reference to the clock RCK. And it provides the clock RCK to the recording block 18, digital/analog converter 16 and audio link block 12.

The digital/analog converter 16 is a so-called 1-bit D/A converter to convert the digital audio signal DA to an analog signal by the PWM modulation. Namely, it generates an analog signal-converted audio signal and drives the speakers 4 connected to the disc recorder/player 3.

The host computer 15 is composed of a computer to control the operation of the whole disc recorder/player 3. It works in response to the operation of each of controls provided on the control panel of the disc recorder/player 3 to control the operation of the digital signal processor 14 and others, thereby recording the digital audio signal DA to a disc and providing it as a sound from the speakers.

For processing the digital audio signal DA sent from the disc player 2, the host computer 15 will generate and send a control command for the disc player 2 correspondingly to the data amount of digital audio signal DA held in the memory 13, and control, by varying, the data amount of the digital audio signal DA per unit time, sent from the disc player 2, correspondingly to the data amount of digital audio signal DA held in the memory 13.

Next, the rate control in this embodiment will be described:

The applications using the rate control command includes jitterless playback of audio stream (jitterless playback at a destination device), high-speed dubbing of audio or video stream (high-speed dubbing between source and destination devices), external synchronization of video or audio stream (output from a source device of data synchronous with an external clock), etc.

Since the function used by the rate control command varies for each of such applications, so a command receiving side (target) will support only a necessary function for an application. In this case, a command issuing side (controller) will provide a mode efficient control if it is known which function a target unit supports. Furthermore, the functions are not completely independent of each other. For example, a combination of an internal clock and quadruple speed is possible while a combination of an external clock and quadruple speed is not possible, as the case may be.

In this embodiment, commands are set for checking whether a target supports a combination of states designated by each function.

More specifically, in this embodiment, it is defined to enable the connection defined in the IEC-61883 and the rate control for isochronous data transfer between audio/video units, two rate control models, namely, a command-based rate control and clock-based rate control, and commands (subfunctions) for selection of clock source, setting of base rate, control of flow rate, and inquiry of capability are included in the AV/C command transaction set.

A source device has functions, correspondingly to the functions of commands, of any of clock source selection (SYNC SELECT: external clock synchronization (EXTERNAL), internal clock synchronization (INTERNAL) and flow control (FLOW CONTROL)), base rate setting (BASE CONFIGURE: any of normal speed, double, . . . , sixteen-fold, for example), flow rate control (FLOW CONTROL: fine adjustment ($\pm 1\%$) of rate in relation to the base rate; standard, high and low, for example), inquiry of capability (CAPABILITY INQUIRY), etc. With the CAPABILITY INQUIRY function, it is possible to check, before the functions are used, whether a target unit supports a combination of these functions, for example, a combination of internal clock with quadruple speed, combination of flow rate control, quadruple speed and high speed or the like, for example.

Figure 12:
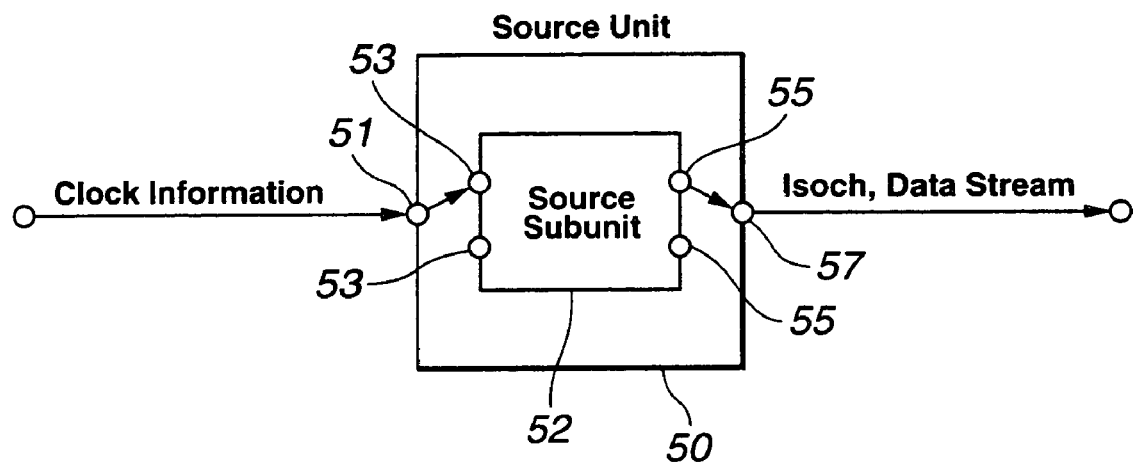
FIG. 12 explains the connection for the clock-based rate control.

Note that for a connection for the clock-based rate control, a configuration as shown in FIG. 12 for example, is possible. In the connection shown in FIG. 12, clock information is transmitted to destination plugs 53 of a source subunit 52 via serial bus input plug or external input plug 51 of a source device 50, and data is transmitted from a serial bus output plug 57 of the source device 50 via a source plug 55 of the source subunit 52. In the configuration shown in FIG. 12, a data transmission rate is determined for the source device 50 based on clock information.

Figure 13:
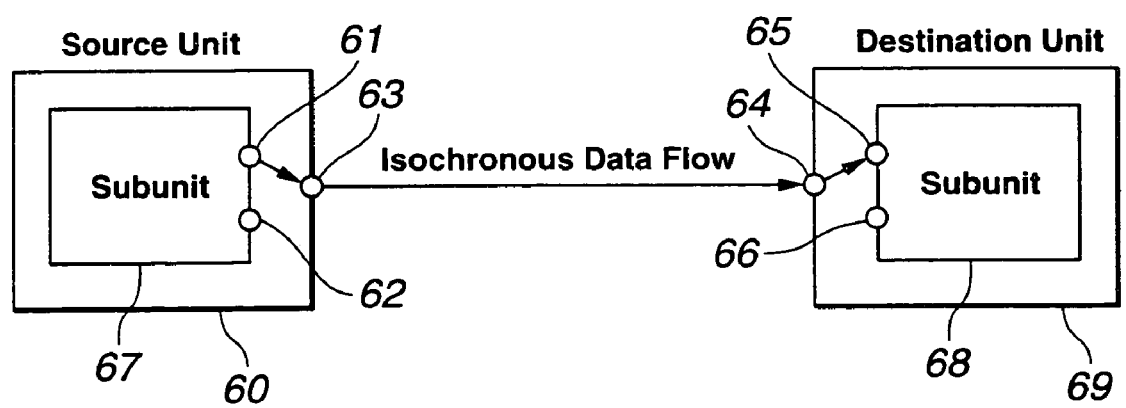
FIG. 13 explains the connection for the command-based rate control.

Also, for a connection for the clock-based rate control, a configuration as shown in FIG. 13 for example, is possible. In the connection shown in FIG. 13, isochronous data flow information is transmitted from a source plug 61 or 62 of a source device 60 to a serial bus input plug pf a subunit 68 of a destination device 60 via a serial bus output plug 63 of the source device 60, and to a destination plu 65 or 66 of a subunit 68. In the configuration shown in FIG. 13, a command-based rate control is made for the subunit 68 of the destination device 60 by the source device 60.

The rate control command for the command-based rate control is used to control the data rate on the plug of each subunit of the destination device, and it includes subfunctions.

The above subfunctions generally include any of clock source selection (SYNC SELECT: external clock synchronization (EXTERNAL), internal clock synchronization (INTERNAL) and flow control (FLOW CONTROL)), base rate setting (BASE CONFIGURE: any of normal, double, . . . , sixteen-fold, for example), flow rate control (fine adjustment ($\pm 1\%$) of rate in relation to the base rate; standard, high and low, for example) when the flow control is selected, and inquiry of capability (CAPABILITY INQUIRY).

The clock source select subfunction (SYNC SELECT) is used to select a clock source for synchronization of a data stream on the plug of the source subunit. The clock source to be selected is any of an internal clock (INTERNAL), external clock (EXTERNAL) and flow rate control (FLOW CONTROL).

The BASE CONFIGURE subfunction is provided to set a reference rate or base rate on the plug of the subunit before transmission of a data stream. That is to say, the rate control is made in one-to-one relation between the units. However, a plurality of units can be set as destinations which are to be subjected to the rate control. A base rate is set for one of the destination devices by the base rate set subfunction (BASE CONFIGURE), and this unit works as a source device to control the flow rate on the serial bus output plugs of the subunits. This rate control is exclusively done, so the SYNC SELECT subfunction is used for effecting or canceling the exclusive data rate control. Note that the BASE CONFIGURE subfunction is used independently of whether the SYNC SELECT subfunction is selected or not.

The FLOW CONTROL subfunction is provided to enable a dynamic rate control on the serial bus input plugs of the subunits even during data transmission. The FLOW CONTROL subfunction is invalid only when the FLOW CONTROL subfunction is selected with the SYNC SELECT subfunction selected.

The CAPABILITY INQUIRY subfunction is used to know the capability of the plug of a subunit related to a rate control command. When a rate control command is effected under the command-based rate control, the CAPABILITY INQUIRY subfunction is supported. A capability of a subunit plug is represented by a total of 3 bytes including one byte indicating a clock source select state (internal clock synchronization, external clock synchronization or flow rate control), one byte indicating a selected base rate (normal, double, . . . , or sixteen-fold) and one byte indicating a flow rate control state (standard, high or low).

The format of the aforementioned rate control command is as shown in FIG. 14. A rate control command as shown in FIG. 14 will be sent to a subunit and the data rate be controlled on the plug of the subunit.

The subfunction field in FIG. 14 is set as shown in FIG. 15. SYNC SELECT in FIG. 15 means the clock source select subfunction for synchronization of a stream on the subunit source plug, BASE CONFIGURE means the base rate set subfunction for calculation of a base rate on the subunit source plug, FLOW CONTROL means the flow rate control subfunction for control of the flow rate on the subunit source plug, and CAPABILITY INQUIRY means the capability inquiry for matching between the rate command and data rate on the subunit plug.

The SYNC SELECT subfunction in FIG. 15 is expressed as in FIG. 16. The result field in FIG. 16 has any of values in a table shown in FIG. 17. The sync_select_state in FIG. 16 is expressed as in FIG. 18, and it designates the select state for synchronization on the subunit plug. FIG. 19 shows a table of the result field in FIG. 16, which will be when the selected state is stable.

The BASE CONFIGURE subfunction in FIG. 15 is expressed as in FIG. 20. The result field in FIG. 20 has any of values in a table shown in FIG. 21. The base_config_state field in FIG. 20 is expressed as in FIG. 22, and it designates the base rate and configuration. FIG. 23 shows a table of the result field in FIG. 20, which will be when the selected state is stable.

The FLOW CONTROL subfunction in FIG. 15 is expressed as in FIG. 24. The result field in FIG. 24 has any of values in a table shown in FIG. 26. FIG. 27 shows a table of the result field in FIG. 24, which will be when the selected state is stable.

The CAPABILITY INQUIRY subfunction in FIG. 15 is expressed as in FIG. 28. The combination_of_state [ ] in FIG. 28 has any of values in a table shown in FIG. 29. Each but of the result field in FIG. 28 indicates whether a designated combination is supported or not, and has a value shown in FIG. 30.

Figure 31:
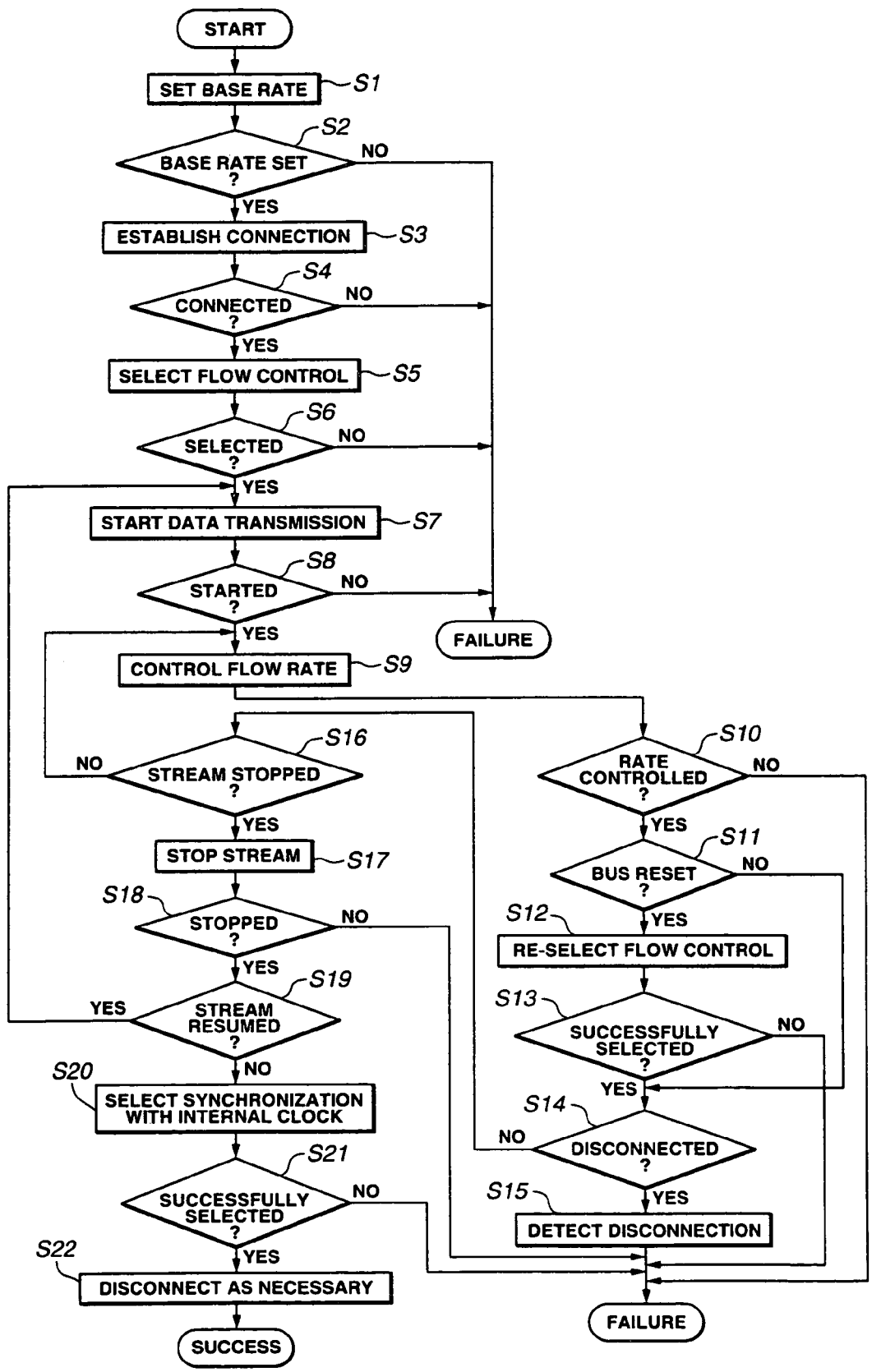
FIG. 31 is a flow chart of operations made in the base rate control controllers in a source device with a source subunit plug and a destination device with a subunit destination plug, do using the subfunctions.

Referring now to FIG. 31, there is shown a flow chart of operations made by a source device having a source subunit plug and a controller of the destination device having a subunit destination plug will do using the subfunctions.

As shown, first at step S1, the controller will set a base rate. Namely, the controller will use the rate control command to set the base rate on the subunit plug. Next at step S2, the controller judges whether the base rate has been set or not. When it is determined that the base rate has not been set, the controller will send a message, for example, of failure in the setting. If the controller determines that the base rate has been set, it will go to step S3.

At step S3, the controller establishes the connection. More specifically, if no connection is established between the source plug of the subunit and serial bus output plug of the source device, the controller will use a CONNECT control command to establish that connection. Also, if no connection is established between the destination plug of the subunit and serial bus input plug of the destination device, the controller will use the CONNECT control command to establish the connection. Further, the controller will make a connection between the serial but output plug of the source device and serial bus input plug of the destination device using the method defined in IEC-61883. Note that when a higher rate than the set base rate is required, the controller will break the connection between the source and destination devices, having been made before the base rate is set, and thereafter re-established that connection. After the establishing the connection as at step S3, the controller will judge at step S4 whether the connection has been established. If the controller determines at step S4 that the connection has not been established, it will send a message of the failure in the connection. When it determines at step S4 that the connection has been established, the controller goes to step S5.

At step S5, the controller selects a flow rate control state. More specifically, the controller uses a RATE status command of the SYNC SELECT subfunction to check the clock source select state on the subunit source plug. Also, when the clock source is the internal clock, the controller uses the RATE status command of the SYNC SELECT subfunction to select a flow rate control state. Thereby, the clock source select state is changed to a flow rate control state. After the operation at step S5, the controller goes to step S6 where it will judge whether the selection has been made successfully. When the controller determines at step S6 that the selection has not been made successfully, it will send a message of the failure. If it is determined that the selection has been made successfully, the controller goes to step S7.

At step S7, the controller starts data transmission, and selects a flow rate control state. Note that at this time, the output rate is the base rate set by the base rate setting operation. After the operation at step S7, the controller goes to step S8 where it will judge whether the data transmission has been started or not. If the controller determines at step S8 that the data transmission has not yet been started, it will send a failure message. When it is determined that the data transmission has been started, the controller will got to step S9.

At step S9, the controller effects a flow rate control. More specifically, the controller having selected the flow rate control state will use the rate control command of the flow rate control subfunction to control the flow rate on the subunit source plug. After the operation at step S9, the controller goes to step S10 where it will judge whether the rate has been controlled. If the controller determines at step S10 that the rate has not been controlled, it will send a failure message. When it is determined at step S10 that the rate has been controlled, the controller will go to step S11.

At step S11, the controller judges whether the bus has been reset or not. If it is determined that the bus has not been reset, the controller goes to step S14. When the controller determines that the bus has been reset, it will go to step S12.

At step S12, the controller selects again the flow rate control state for identification. More specifically, if the controller having selected the flow rate control state detects the serial bus having been reset, it will select again the flow rate control state of a subunit source plug having a node ID assigned for the purpose of the identification. After the operation at step S12, the controller goes to step S13 where it will judge whether the flow rate control has been made successfully. If the controller determines at step S13 that the flow rate has not been controlled successfully, it will send a failure message. If it is determined at step S13 that the flow rate has been controlled successfully, the controller goes to step S14.

At step S14, the controller judges whether the connection has been broken or not. If it is determined at step S14 that the connection has not been broken, the controller goes to step S16. If not, the controller goes to step S15.

At step S15, the controller detects whether the connection has been broken or not. When it is detected that the connection has not been broken, the controller will got to step S16. If the controller detects that the connection has been broken, it will got to step S15.

At step S16, the controller judges whether the data transmission should be stopped or not. If it determines that the data transmission should be stopped, it will return to step S9. When the controller determines at step S16 that the data transmission should not be stopped, it will go to step S17.

At step S17, the controller stops the data transmission. More specifically, the controller uses a STOP control command (a control command defined in the AV/C Disc Subunit General Specification [5]) to have the source device stop the data transmission. After the operation at step S17, the controller goes to step S18 where it will judge whether the data transmission has been stopped or not. If the controller determines at step S18 that the data transmission has not been stopped, it will send a failure message. When it is determined at step S18 that the data transmission has been stopped, the controller will go to step S19.

At step S19, the controller judges whether the data transmission should be resumed or not. If it determines at step S19 that the data transmission should be resumed, it will return to step S7. If not, the controller goes to step S20.

At step S20, the controller selects an internal clock as the clock source. More specifically, the controller having selected the flow rate select state uses the RATE control command by the SYNC SELECT subfunction to restore the internal clock. Note that the controller will use the RATE control command of the BASE CONFIGURE subfunction to reset the base rate as necessary. After the operation at step S20, the controller goes to step S21.

At step S21, the controller judges whether the internal clock has been selected successfully or not. If it is determined at step S21 that the internal clock has not been selected successfully, the controller sends a failure message. When the controller determines at step S21 that the internal clock has been selected successfully, it will got to step S22.

At step S22, the controller breaks the connection as necessary. More specifically, the controller will break the connection between the serial bus output plug of the source device and serial bus input plug of the destination device. Also the controller will break the connection between the subunit source plug and serial bus output plug of the source device, and further the connection between the destination plug of the subunit and serial bus input plug of the destination device.

Thereafter, the controller will send a message of the process having been complete.

INDUSTRIAL APPLICABILITY

As apparent from the foregoing, the present invention provides a digital signal processing apparatus and method and a digital signal processing system, in which a command for inquiry of the capability of supporting the rate control is generated and sent to devices connected via a predetermined transmission path, and each device examines, in response to the command it receives, its own capability of supporting the rate control and sends back the result of the examination, so that digital signal can be transmitted between specific devices positively and successfully.

The invention claimed is:

1. A digital signal processing system including a first digital signal processing apparatus, a predetermined digital bus, and a second digital signal processing apparatus, wherein the predetermined digital bus supports real-time data transmission for transmitting audiovisual data and asynchronous data transmission for transmitting control data, and a plurality of electronic apparatuses including the first digital signal processing apparatus and the second digital signal processing apparatus are connected to the predetermined digital bus, the first digital signal processing apparatus comprising:

first command generating means for generating a first command for making an inquiry to the second digital signal processing apparatus connected via the predetermined digital bus about a capability of rate control functions of the second digital signal processing apparatus;

second command generating means for generating a second command for rate control of the real-time data transmission of the second digital processing apparatus;

first command transmitting means for transmitting the first command to the second digital signal processing apparatus via the predetermined digital bus;

first response receiving means for receiving a first response to the first command, wherein the first response is transmitted from the second digital signal processing apparatus via the predetermined digital bus;

second command transmitting means for transmitting the second command to the second digital signal processing apparatus via the predetermined digital bus;

real-time data receiving means for receiving the real-time audiovisual data transmitted from the second digital signal processing apparatus; and the second digital signal processing apparatus comprising:

first command receiving means for receiving the first command for inquiry about the capability of rate control functions of the second digital signal processing apparatus transmitted from the first digital signal processing apparatus via the predetermined digital bus;

second command receiving means for receiving the second command for rate control of the real-time data transmission of the second digital signal processing apparatus transmitted from the first digital signal processing apparatus via the predetermined digital bus;

first command examining means for examining, in response to the first command, the capability of rate control functions of the second digital signal processing apparatus;

first response sending means for sending a result of the examination of the first command examining means to the first digital signal processing apparatus in response to the first command;

second command examining means for examining, in response to the second command, the rate control of the real-time data transmission of the second digital signal processing apparatus; and real-time data transmitting means for transmitting the real-time audiovisual data at the controlled rate in response to a result of the examination of the second command examining mean, wherein the first digital signal processing apparatus further comprises recognizing means for recognizing, based on the received first response, the rate control functions of the second digital processing apparatus.

* * * * *

UNITED STATES PATENT AND TRADEMARK OFFICE
CERTIFICATE OF CORRECTION

| | | |
|---|---|---|
| PATENT NO. | : 7,400,644 B2 | Page 1 of 1 |
| APPLICATION NO. | : 11/114974 | |
| DATED | : July 15, 2008 | |
| INVENTOR(S) | : Ichiro Sakamoto and Makoto Sato | |

It is certified that error appears in the above-identified patent and that said Letters Patent is hereby corrected as shown below:

On the Title Page, Item (30), please add --Foreign Application Priority Data JP P11-145472 filed May 25, 1999--

Signed and Sealed this
Eighth Day of March, 2011

David J. Kappos
*Director of the United States Patent and Trademark Office*